Oct. 13, 1964     S. M. MARCO ETAL     3,152,402
METHOD AND APPARATUS FOR MEASURING BELTS
Filed Jan. 5, 1960     4 Sheets-Sheet 1

INVENTORS
SALVATORE M. MARCO
WALLACE H. WOODROW
BY

Reuben Wolk
ATTORNEY

Oct. 13, 1964   S. M. MARCO ETAL   3,152,402
METHOD AND APPARATUS FOR MEASURING BELTS
Filed Jan. 5, 1960   4 Sheets-Sheet 2

INVENTORS
SALVATORE M. MARCO
WALLACE H. WOODROW
BY
Reuben Wolk
ATTORNEY

Oct. 13, 1964  S. M. MARCO ETAL  3,152,402
METHOD AND APPARATUS FOR MEASURING BELTS
Filed Jan. 5, 1960  4 Sheets-Sheet 3

INVENTORS
SALVATORE M. MARCO
WALLACE H. WOODROW
BY
Reuben Wolk
ATTORNEY

INVENTORS
SALVATORE M. MARCO
WALLACE H. WOODROW
BY

*Reuben Wolk*

ATTORNEY

United States Patent Office 3,152,402
Patented Oct. 13, 1964

3,152,402
METHOD AND APPARATUS FOR MEASURING BELTS
Salvatore M. Marco, Columbus, and Wallace H. Woodrow, Dayton, Ohio, assignors to Dayco Corporation, a corporation of Ohio
Filed Jan. 5, 1960, Ser. No. 549
6 Claims. (Cl. 33—147)

This invention relates to the art of belt measurement, and is particularly directed to a method and means for determining and comparing the operative length and hop characteristics of power transmission belts and the like.

Prior methods and equipment for belt measurement have not kept pace with the requirements of industry, as they normally consist of mechanical devices for checking belts which entail long mechanical linkages and heavy moving parts through which belt measurements are transmitted to a mechanical indicator. Belt measurements so obtained are influenced by backlash and inertia effects inherent in operation of such linkages and movement of these heavy parts, and thus their accuracy is highly questionable. Today, industry requires that power transmission belts have precision characteristics so that the efficiency and output of powered equipment in which they are employed can be accurately predicted. Therefore, it is obvious that prior methods and apparatus for belt measurement and inspection are no longer satisfactory.

The invention is directed to satisfying the needs of present day industry for precision methods and apparatus for checking, inspecting and comparing characteristics of power transmission belts and the like. It provides a simplified apparatus and procedure for checking the operative length and hop characteristics of belts producing results accurate to .001 of an inch by utilizing a simple but highly accurate optical indicating means from which belt length and hop in operation can be quickly and directly observed and compared.

A primary object of the invention is to provide improved apparatus for measuring characteristics of transmission type belts which may be simply fabricated and operated with a minimum of trouble and capable of checking a wide range of sizes and styles.

A further object of the invention is to provide a simple method for determining the operative length and hop characteristics of transmission type belts with a high degree of efficiency and accuracy.

Another object of the invention is to provide apparatus for accurately measuring and comparing the operative length and hop characteristics of power transmission belts and the like.

An additional object of the invention is to provide belt inspection equipment employing optical indicating means permitting precision measurements of belt characteristics.

Another object of the invention is to provide improved means and methods particularly applicable for checking the operative length and hop characteristics of transmission type belts employing the advantageous structural features, the inherent meritorious characteristics and the means and mode of operation herein described.

With the above primary and other incidental objects in view which will more fully appear in the specification, the invention intended to be protected by Letters Patent consists of the features of construction, the parts and combination thereof, and the mode of operation hereinafter described or illustrated in the accompanying drawings, or their equivalents.

The drawings illustrate a preferred form of the invention, in which.

Figure 1:
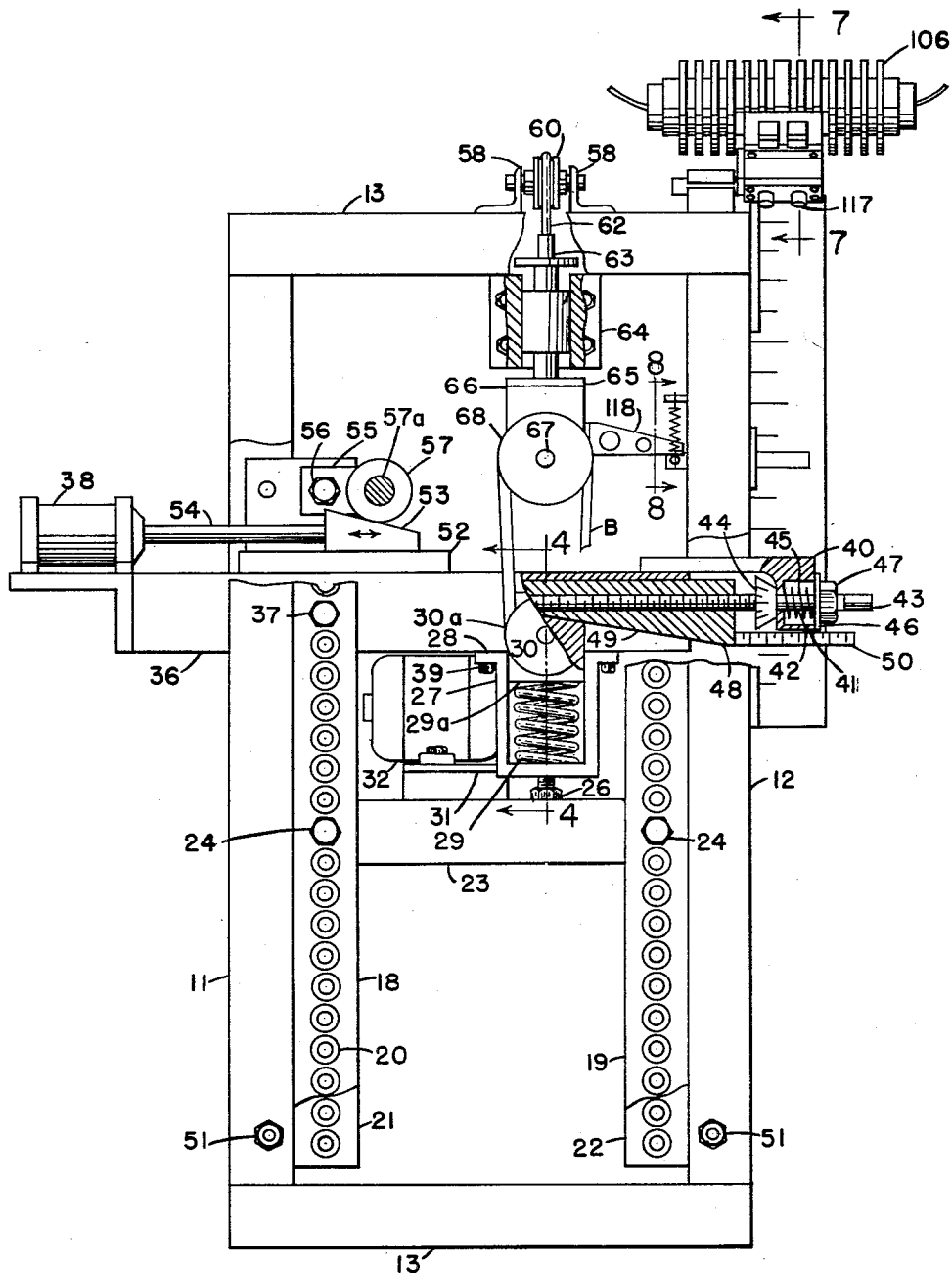
FIGURE 1 is a front elevation of the apparatus, partially in section, in accordance with the invention.
Figure 2:
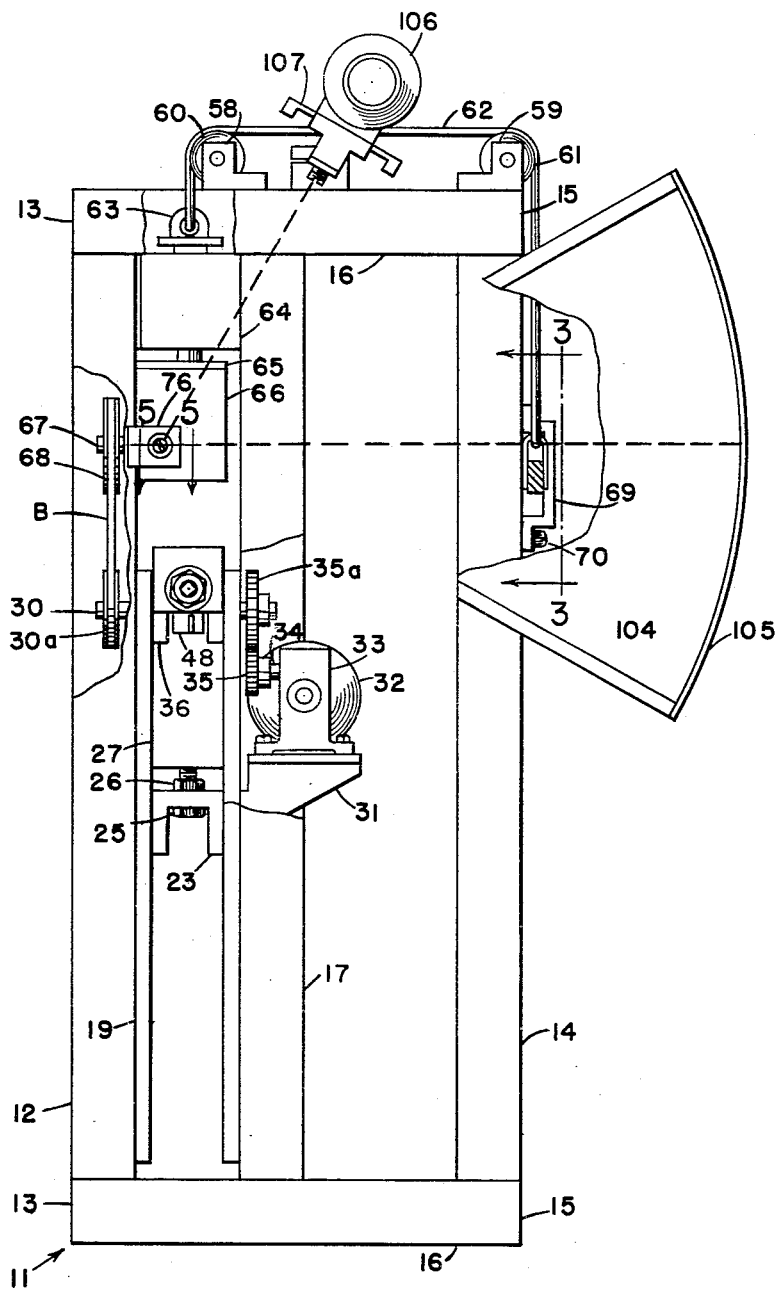
FIGURE 2 is a side view of the apparatus of FIGURE 1, with portions of the structure broken away for clarity.

Turning now to the drawings, the novel device is housed in a framework 11 consisting of a number of structural beams which may be bolted, welded, or riveted together. As best shown in FIGURES 1 and 2, the framework is essentially rectangular and includes a pair of vertical beams 12, interconnected at top and bottom by cross beams 13, forming the front of the framework. A similar set of vertical beams 14 are interconnected by cross beams 15 at top and bottom and form the rear of the framework. The front and rear sections are interconnected by means of four transverse beams 16, which run from the corners of each of the intersections of vertical and cross beams. These members thus form the open rectangular framework 11 which is the primary structure. For added strength, a pair of intermediate vertical beams 17, located between front and rear vertical beams 12 and 14, extend between upper and lower transverse beams 16.

Mounted on the rear face of and inward of the front vertical beams 12 by means of bolts 51, are plates 18 and 19, having apertures 20 therein. These apertures are very accurately spaced and located, for example, exactly one inch apart, in order to provide incremental mounting of cross members as described below. Mounted on the forward face of intermediate vertical members 17 are similar plates 21 and 22, in vertical and horizontal alignment with plates 18 and 19 respectively. These latter plates also have apertures 20 which align with the apertures in the forward plates. The plates 18 and 21 on the left side of the framework extend somewhat higher than plates 19 and 22 on the right side.

A support 23 extends horizontally across the front portion of the framework 11 spaced above and generally parallel to the cross beam 13, and is mounted between plates 18 and 21 at one end and plates 19 and 22 at the other end. This support 23 may have any cross-section, but is shown as a U-shaped channel member. The ends of the support are provided with axially aligned apertures adapted to align with apertures in the confining plates, and are mounted thereto by means of bolts 24 which pass through the aligned apertures to fix the position of the support relative to the framework 11. A threaded bolt 25 is engaged through an aperture in the horizontal portion of the support 23, the head of the bolt 25 abutting the undersurface of the support and its threaded extremity projecting vertically to receive a nut 26 thereabout which clamps the bolt to the beam. A rectangular cup-like housing member 27 has the center of its base seated on the end of bolt 25 to define the lowermost position of member 27. The upper end of the member 27 has an external flange 28 which is mounted to another portion of the structure as later described. A coil spring 29 is mounted within member 27, and mounted on the upper end of said spring, and concentrically contained within the member 27, is a housing 29a which provides a bearing for a shaft 30. (See FIGURE 4.) The ends of the shaft 30 project from, and at right angles to, the forward and rear faces of the housing 29a, spaced vertically upward from the upper extremity of the cup-like member 27. Upon the end of the shaft 30 which projects from the forward face of the housing is mounted a pulley 30a.

Fixed to the upper surface of support 23 is a support bracket 31 which projects rearwardly from the support to mount a motor 32. The motor 32 is so positioned that its drive shaft projects at right angles to shaft 30 and is spaced below and to the rear thereof. A transmission unit 33 is mounted on the motor 32 to connect to the motor drive shaft and provide an output shaft 34 arranged parallel to and below the shaft 30. Conventional drive gears 35 and 35a are mounted on these shafts and provide a positive drive to shaft 30 and therefore, to pulley 30a. Conventional controls are provided to energize the motor 32 to drive its shaft through transmission unit 33.

A structural supporting beam 36 preferably having a V-shaped section, extends horizontally across the front of the framework above and parallel to the support 23, and is mounted near its left end between plates 18 and 21 by means of a bolt 37 which provides a pivotal support through the beam and aligned apertures of the plates. The left end of the beam projects outwardly of the framework 11 between the plates, and on the cantilevered end thereof is mounted an air cylinder 38. The other end of beam 36 extends across the framework from the pivot 37 to terminate between the plates 19 and 22. The beam 36 also provides a mounting on its lower surface for the cup-like housing member 27 which is attached thereto by means of bolts 39 passing through flange 28. The beam is cut away to provide for the mounting of the housing 29a referred to above, as shown in FIGURE 1.

Also mounted on the beam 36, at the upper surface of the right hand end thereof, is a bracket 40. The bracket includes a downwardly extending arm 41, which has an aperture extending therethrough, larger in diameter at the right end of the arm to provide a spring retaining recess 42.

An externally threaded shaft 43 extends through the aperture, and a conical collar 44 is mounted on the shaft as shown in FIGURE 1. A coil spring 45 is mounted concentrically of the shaft 43 and retained at one end by the shoulder in recess 42, and retained at the other end by a washer 46 about the outwardly projected end of shaft 43. The washer is clamped to the outer face of arm 41 by means of a nut 47 which is mounted on the end of shaft 43 outwardly of the washer.

The major portion of shaft 43 projects inwardly of the framework 11 and is mounted in a cam plate 48 which in elevation has the general form of a right triangle. Shaft 43 enters the right side of cam plate and runs parallel to its upper surface, which is parallel to the member 36. The lower surface 49 of the cam plate slopes upwardly to the left.

Figure 4:
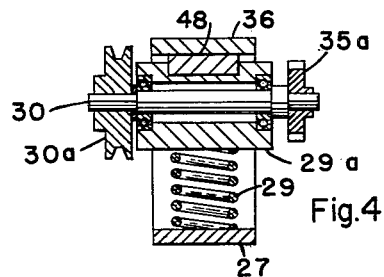
FIGURE 4 is a sectional view of the lower sheave support, taken on lines 4—4 of FIGURE 1.

The housing 29a, which is directly in the path of plate 48, has a transverse groove in its upper surface and the innermost extremity of plate 48 is slidable therein as shown in FIGURE 4. The spring 45 produces a bias against bracket 40 which is directed outwardly of the framework. By rotation of nut 47 which is locked on shaft 43, the shaft 43 is also rotated and drives cam plate 48 to the left or to the right, which in turn moves housing 29a to create a fine vertical adjustment of housing 29a and pulley 30a thereby, either under or against the influence of spring 29 which reacts against the housing. A longitudinal arm 50 is mounted to project outwardly at right angles to the outermost face of arm 41 parallel to shaft 43 and adjacent the outer peripheral portion of collar 44. The collar 44 and arm 50 are appropriately scaled to cooperate and provide a precise reading off any vernier type vertical adjustment of pulley 30a for purposes to be further described.

It will be seen at this point that beam 36 is connected at one end of framework 11 at a single pivot by bolt 37 while its other end is freely supported on housing 29a through the medium of cam plate 48 bearing in the groove of said housing. A bearing plate 52 is fixed to the upper surface of beam 36 to extend from a point outwardly of pivot 37 between plates 18 and 21 to a point inwardly of the framework 11 to the other side of bolt 37. Plate 52 has a guide channel longitudinally of its upper surface slidably accommodating a cam plate 53, the upper surface of which is inclined downwardly to the right as shown in FIGURE 1. A piston rod 54 projecting from the air cylinder 38 connects to plate 53 for movement longitudinally of the plate 52, for reasons to be explained below. A pair of brackets 55 are attached to the plates 18 and 21 by means of a bolt 56. At the other end of these brackets 55 is a roller 57 which is mounted on a rotatable shaft 57a attached to the brackets. The roller bears upon the inclined upper surface of plate 53.

Figure 3:
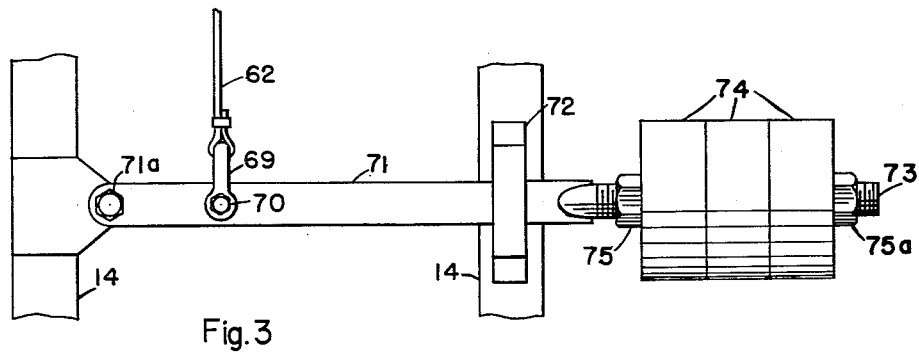
FIGURE 3 is a view of a portion of the apparatus, taken along lines 3—3 of FIGURE 2.

Mounted on the upper surface of the upper cross beam 13 are a pair of brackets 58, mounted at the forward side, and a pair of brackets 59, mounted on the rearward side of the framework. A pulley 60 is mounted within brackets 58, and a similar pulley 61 is mounted within brackets 59, both pulleys in horizontal alignment. A cable 62 extends across pulleys 60 and 61 and passes downward in the front of the framework to connect to the eye 63 of a rod mounting a suspension unit 64. To the lower extremity of unit 64 is mounted a plate 65 bolted to the upper surface of a housing 66 which serves as a bearing means rotatably mounting a shaft 67. Mounted on the forward face of shaft 67 is a pulley 68 which is in the same plane as pulley 30a. The other end of cable 62 extends around the back of framework 11 to connect to a shackle 69 pivotally fastened by bolt 70 to a bar 71 adjacent and spaced from one end thereof, as best shown in FIGURES 2 and 3. The bar 71 is pivoted at this one end to a vertical beam 14 of framework 11 at pivot point 71a, while its other end extends across the back of the framework and projects through a vertical slot in a bracket 72 fixed to the other beam 14. Fixed to the end of bar 71 and forming an axial extension thereof outwardly of the framework 11 is an externally threaded rod 73. A series of annular weights 74 mount on rod extension 73 between nuts 75 and 75a, and provide a counterweight for applying a predetermined tension on cable 72 through bar 71 to exert a bias on sheave 68, causing it to assume a particular reference position vertically of framework 11 governed by the nature of suspension unit 64.

Figure 5:
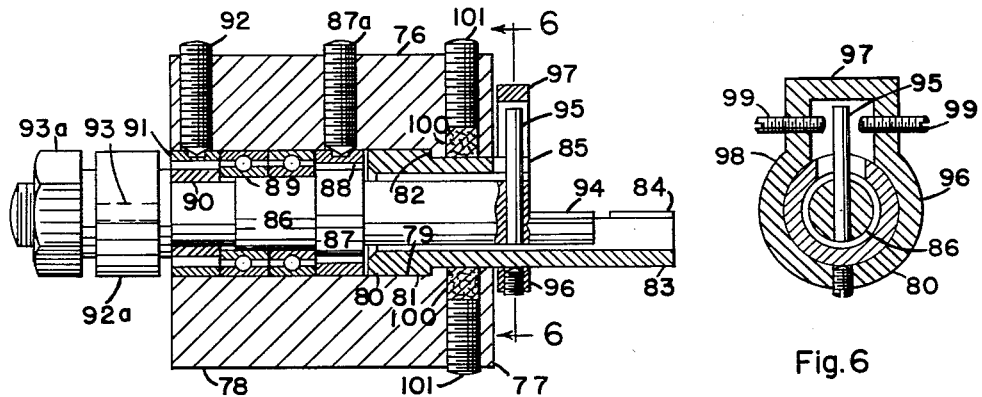
FIGURE 5 is a sectional view of the optical reflector assembly taken along line 5—5 of FIGURE 2.

Mounted on the right hand side of the framework 11 is a housing 76, more clearly detailed in FIGURE 5. The housing 76 has a right hand face 77 and a left hand face 78, and an axial opening 79 extending between these faces. Mounted within the opening 79 is a tubular sleeve 80 which is rotatably mounted in the housing 76. One end of this sleeve has a flange 81 abutting a mating shoulder 82 on the housing, while the other end projects outwardly from the face 77. The outwardly projecting end of sleeve 80 has a cut out portion from a point spaced outwardly of the housing face 77 leaving a projecting extremity 83 which is arcuate and less than semi-circular in cross-section. On the projecting extremity 83 is mounted a mirror 84, the uppermost surface of which forms a part of the periphery of the extremity. The mirror 84 is uppermost and spaced outwardly from the extremity of the cut back portion of sleeve 80 which is provided with a central notch 85, at right angles to the mirror 84. A central shaft 86 is rotatably mounted within the sleeve 80, and is concentric therewith. The shaft 86 has a radially enlarged portion 87 which abuts flange 81 to provide thrust bearing, and a ring 88 is mounted concentrically of the shaft portion 87 by means of a set screw 87a. A pair of abutting axially aligned ball bearings 89 are mounted about shaft 86 between the ring 88 and a similar ring 90 which is mounted at the end of the shaft. The bearings thus permit relative rotation of the shaft 86 and the outer tubular sleeve 80. Another ring 91, spaced outwardly of ring 90, is fixed concentric therewith by means of a set screw 92 to abut the outer race of the bearings. The left hand end of shaft 86 is threaded and projects from the housing face 78 to mount a collar 92a which is integral with control arm 93 in spaced relation thereto confined between ring 90 and nut 93a. The arm 93 extends at right angles to the shaft 86 in a horizontal plane.

Figure 6:
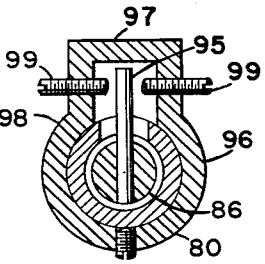
FIGURE 6 is a sectional view taken on line 6—6 of FIGURE 5.
Figure 8:
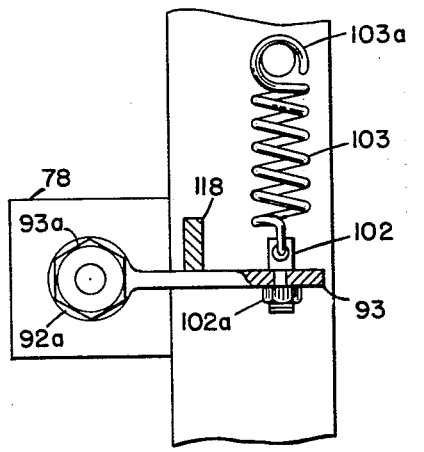
FIGURE 8 is a view, partially in section, taken along line 8—8 of FIGURE 1.

The end of shaft 86 projecting from the housing at its face 77 terminates just short of the mirror 84 mounted on the outer sleeve 80, and is cut back in a similar manner to extremity 83 to permit mounting of mirror 94 on its uppermost surface. This mirror 94 forms the upper periphery of the shaft. Both mirrors 84 and 94 are thus adjacent and extend outwardly of the housing 76 and the framework 11, at the right side as viewed in FIGURE 1. As best shown in FIGURE 6, a pin 95 is projected through shaft 86 to have one end project through the notch 85 in sleeve 80. A collar 96 is mounted about the notched portion of sleeve 80 adjacent the face 77 of housing 76. The collar 96 has a portion 97 which is located radially outward from sleeve 80 opposite notch 85 to provide parallel arms 98 at either side of the notch and either side of pin 95. Set screws 99 adjustably engaged through arms 98 at either side of pin 95 provide means for limiting the movement of pin 95 relative the sleeve 80, and thus will also limit movement of the inner shaft 86 with respect to sleeve 80. This will be more fully described below. It will be noted that sleeve 80 is rotatable relative to the housing 76. The housing 76 is provided with opposed apertures communicating with sleeve 80 at diametrically opposed positions. Friction members 100 are mounted within the housing 76 to frictionally engage sleeve 80 and are held in frictional engagement therewith by means of set screws 101. The sleeve 80 is therefore rotatable, yet may be held in any position to which it is turned, by friction members 100. As shown in FIGURE 8, arm 93 is positioned by a spring 103 which is attached to the framework 11 by means of a pin 103a. The other end of the spring is connected to a lug 102 which passes through the arm 93 and is held thereto by means of set screw 102a. This assembly thus establishes an adjustable bias on the arm 93. The arm is established in a predetermined position to normally orient mirror 94 to zero with mirror 84.

Mounted on housing 66 is an arm 118 which is at right angles thereto as seen in FIGURE 1. This arm rests upon arm 93 (see FIGURE 8) to maintain a predetermined relationship between the mirrors and the pulley 68 (through housing 66). This relationship also permits movements of pulley 68 to be transmitted through arms 118 and 92 to the mirrors.

A support plate 104 is bolted at one end to the right side of framework 11 at the rear beam 14, and projects rearwardly of the framework. A plate 105 is fixed to project outwardly at right angles to plate 104 and forms an arc to present a concave screen in the path of mirrors 84 and 94. As shown in FIGURE 1, this screen is indexed to provide reference positions as described below.

Figure 7:
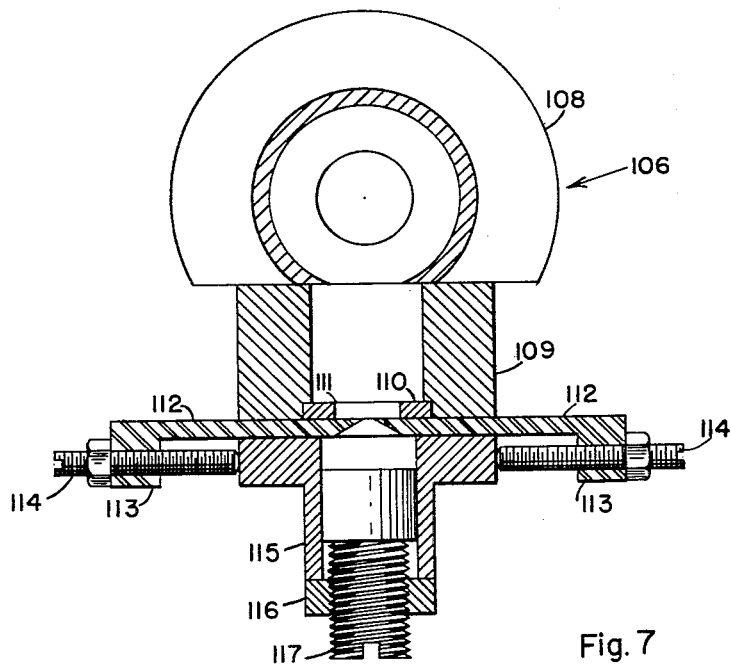
FIGURE 7 is a sectional view of the projection unit taken along line 7—7 of FIGURE 1.

A lamp assembly 106 is mounted on the right side of the framework by means of a bracket 107 having a right angled support arm adjustably mounted on upper beam 16. As shown in FIGURE 7, assembly 106 includes a lamp housing 108 having fins to dissipate heat radiating from a pair of lamps therein. The housing 108 has a central adapter 109 bolted about an aperture, and has a pair of parallel apertures therethrough for directing the beams from the lamps to the mirrors 84 and 94. The surface of the adapter 109 adjacent housing 108 is countersunk at the apertures to nest plates 110 having narrow rectangular slits 111 therein for narrowing the projected lamp beams. Also confined between housing 108 and adapter 109, oriented to dispose knife edge extremities thereof over opposite ends of slits 111, are pairs of opposite blade elements 112 having right angled portions 113 extending away from adapter 109. Screws 114 are projected through the right angled portions 113 of blade elements 112 to engage the adapter. By rotation of the screws 114 the respective pairs of blade elements 112 may be adjusted relative to the slits 111 to vary the area for passage of light beams therethrough in accordance with the requirements of the apparatus. A housing 115 mounting over the projected face of adapter 109 has apertures aligning within the apertures therein and adapters 116 forming projections thereof mounting lens elements 117. The bracket 107 may be adjusted to insure that the light beams projected from the lamp assembly 106 will impinge upon the mirrors 84 and 94 so that the light beams will be reflected from the mirrors to project upon screen 105 in accordance with the respective positions of the mirrors.

*Operation of the Apparatus*

As indicated previously, the apparatus described above is used for measuring the length of belts in order to compare them with standard, or ideal lengths; and is also used for measuring belt hop, or variation in length. When it has been established that a certain length of belt is to be measured, the beam 23 is mounted on the framework 11 by means of bolts 24 through apertures 20 in plates 18, 19, 21, and 22. The specific apertures selected will be governed by the aforesaid belt length, since these apertures are spaced apart at exact dimensions, preferably one inch. Thus the relationship between beam 23 and beam 36 is determined, with the beam 36 in a horizontal position as shown in FIGURE 1. The beam 36 is locked in this position by virtue of the fact that cam plate 53 is locked under the roller 57 which is mounted on the framework. The lowermost position of the beam 36 is controlled by setting the bolt 25, upon which the bottom of member 27 rests. Since member 27 is attached to beam 36, the bolt 25 thus serves as a bottoming control which is set once and not changed during the inspection.

The upper pulley 68 is now established at a position necessary to provide the exact distance between it and the lower pulley 30a which has been located by the positioning of the two beams. It is possible that the distance between 30a and 68 corresponding to the required belt length cannot be established exactly by the above procedure. In such a case, further adjustment of the pulley 30a may be accomplished by a vernier system which is capable of producing any desired spacing, to an accuracy of .001 inch, between the one inch spacing determined by beam location. This fine adjustment is accomplished by rotation of the nut 47 which is fixed on shaft 43, rotating this shaft and collar 44 to move cam plate 48 inwardly or outwardly from the groove in housing 27. As seen in FIGURE 4, motion of the cam plate will urge pulley housing 29a downward against bias of spring 29. It should also be noted that the spring 29 has another function in the system, in that it acts as a dampener to eliminate backlash. The amount of vertical adjustment is directly ascertained in a conventional manner from the resulting relationship of the markings on collar 44 and the adjacent arm 50. The operating arm 118 projecting from the upper support housing 66 is now in a zero reference position and bears on control arm 93 to position shaft 86 and connected mirror 94 is a zero reference position which should be the design or standard belt length.

When it is desired to check the length or hop of a series of belts falling within the group having the predetermined length, the apparatus must first be arranged to permit mounting a belt. This is accomplished by actuating cylinder 38 to drive the piston rod 54 to the left, thus also driving the cam plate 53 to the left (as shown in FIGURE 1). This releases the locking interengagement with the roller 57, which permits the beam 36 to be free to pivot about bolt 37. Because of the weight of the cylinder 38 which is mounted on the end of the beam, this beam is rotated counterclockwise, raising pulley 30a upward sufficiently so that belt B can be positioned over this pulley and pulley 68.

The air cylinder 38 is next actuated again to reverse the movement of piston rod 54 to the right, thus once again locking cam plate 53 under roller 57, and thus seating the beam 36, pulley 30a and member 27 against the bolt 25. At the same time the gear 35a is dropped into mesh with gear 35 so that the mechanism shown in FIGURE 4 can be operated when motor 32 is turned on. A switch is actuated to supply power to lamp assembly 106, and the projected light beam (indicated by dotted lines in FIGURE 2) is reflected from the outer, or relatively fixed mirror 84 and onto the curved screen 105. If the belt is approximately of the correct length, this light beam will fall in the center of the screen. The motor 32 is next actuated, causing pulley 30a to drive belt B and pulley 68 through shaft 34, gears 35 and 35a, and shaft 30. During this operation, the minimum length of the belt will, of course, be measurable; at such length the upper pulley will be at its closest point to the lower pulley (lowermost position), and the housing 66 and arm 118 will also reach their lowermost position. Arm 118 will, in turn, pull the arm 93 downward, rotating this arm and shaft 86 in a clockwise direction (as viewed in FIGURE 8). This in turn causes the pin 95, which is fixed to the shaft 86, to rotate and strike against the right hand set screw 99 (FIGURE 6), and this successively drives collar 96, sleeve 80, and mirror 84 to the right, thus reflecting the light beam to a point on the screen which represents the minimum belt length. This point, of course, is the lowermost point of reflection on the screen. The friction members 100 will now tend to keep the sleeve in this position during the operation of the pulleys and belt. The operator may now read this point on the screen as the actual belt length in order to determine whether it falls within the required range of lengths.

In addition to providing the nominal belt dimension, the operation of the belt and pulleys simultaneously indicates the variation in length, or "hop." This is accomplished by the vertical motion of the belt, which in turn moves pulley 68 up and down against (or under) the influence of the counterweight system. At the same time the arm 118 is reciprocating, and the arm 93 is oscillating under influence of arm 118 or spring 103, and this oscillation is transmitted to shaft 86 and then to the inner mirror 94 mounted thereon. The screws 99 have previously been set so that the oscillating pin 95 (moving with shaft 86) will not reach these screws, and thus the minimum length previously established will not be disturbed. The amount of oscillation of the mirror 94 will govern the range of reflection of light from its source and will appear on the screen as a beam of light oscillating upward from the previously determined minimum point up to a maximum and back again. The screen has a radius in the order of 25 inches, which provides highly accurate readings because of the great magnifications of the comparatively small oscillation of the mirror, which in turn is a function of the distance between the shaft 86 and the point where arm 118 contacts arm 93.

Thus, the method and apparatus of the invention has been shown to be simple and versatile. Since there are a great many applications of the invention its use is presented only in illustrative fashion and variations may be effected to meet the requirements of a particular situation. These will be obvious to those versed in the art, and, accordingly, need not be exhaustively presented. The machine provided will accommodate many lengths and varieties of belts with the same accurate results. The provision for vernier adjustment of pulley 30a gives the apparatus an extreme flexibility and permits precision inspection and checking to a degree not heretofore contemplated. The use of accurately and precisely referenced mirrors to reflect belt length and hop characteristics avoids need for complex recording mechanisms. The magnification of reflected belt characteristics provided by the nature and disposition of screen 105 facilitates precise measurement of the noted belt characteristics to at least within .001 of an inch.

From the above description will be apparent that there is provided a device of the character described possessing the particular features enumerated as desirable, but which obviously is susceptible of modification in form, proportion, detail construction and arrangement of parts without department from the principles involved or sacrificing any of their advantages.

We claim:

1. Apparatus for measuring belts including a fixed and an adjustable pulley in spaced relation, means for establishing reference positions for said pulleys in accordance with the desired length of a belt to be measured, a screen, a first reflecting means operatively connected to said adjustable pulley and movable therewith to reflect variations in its position, said first reflecting means having a light source associated therewith for projecting on said screen a visual indication of the movements of the adjustable pulley to accommodate said belt, and a second reflecting means operatively connected to said first reflecting means oriented to project a visual indication on said screen corresponding to the desired belt length.

2. Apparatus for measuring belts including a fixed and a relatively movable pulley for mounting a belt of a desired size, a concave screen, means for transmitting a light impression on said screen indicative of the position of the relatively movable pulley, means for driving said pulleys and said belt, and further light transmitting means operatively connected to said movable pulley for transmitting belt length and hop in the form of a light beam projected on said screen.

3. Apparatus for measuring belts including a pair of pulleys, one fixed and the other under bias to establish a predetermined reference spacing therebetween accommodating a belt of specified length, a pair of mirror devices axially aligned and operatively connected for establishing one of said mirror devices in a reference position, means operatively connecting said other mirror device for movement under the influence of movement of one of said pulleys, a light source directed to said mirrors, and a concave screen in the path of said mirrors to receive light beams reflected therefrom which are indicative of length of the belt on the pulleys as compared to the specified length.

4. A method of measuring a transmission belt including the steps of establishing a pair of relatively biased pulleys in predetermined spaced relation corresponding to a required belt length, applying a belt to be measured to said pulleys, optically transmitting a visual impression on a screen corresponding to the required belt length, and optically transmitting to said screen a magnified visual impression of pulley adjustment to accommodate the actual length of the belt and provide a direct representation of actual belt length thereon as related to required belt length.

5. A method of checking a belt for length and hop during operation including the steps of establishing a beam of light on a screen related to the required pulley spacing for a specific length belt, driving said belt about relatively biased pulleys referenced to said screen to provide for relative automatic adjustment of said pulleys to accommodate the actual length of the belt, optically magnifying the relative adjustment of said pulleys and projecting a comparative beam on said screen to show precise deviation of the actual from the required belt length and variation in pulley spacing resulting from belt hop in operation.

6. A method of checking the length of a belt including the steps of establishing belt mounting means in spaced relation, to provide for mounting a belt of a desired length, projecting a light beam on a screen referenced to said mounting means at a position indicative of the desired belt length, applying a belt to be checked to said belt mounting means, optically magnifying relative adjustment of the belt mounting means to accommodate the belt and projecting a light beam corresponding thereto on said screen to provide a precise optical comparison of the actual length of said belt to said desired length.

References Cited in the file of this patent

UNITED STATES PATENTS

| | | |
|---|---|---|
| 438,300 | Edison | Oct. 14, 1890 |
| 1,947,280 | Thearle | Feb. 13, 1934 |
| 1,955,581 | Gates | Apr. 17, 1934 |
| 2,044,983 | Hedgepeth | June 23, 1936 |
| 2,159,969 | Furst | May 30, 1939 |
| 2,318,530 | Schick et al. | May 4, 1943 |
| 2,532,715 | Haren | Dec. 5, 1950 |
| 2,838,929 | Freeder | June 17, 1958 |